United States Patent Office

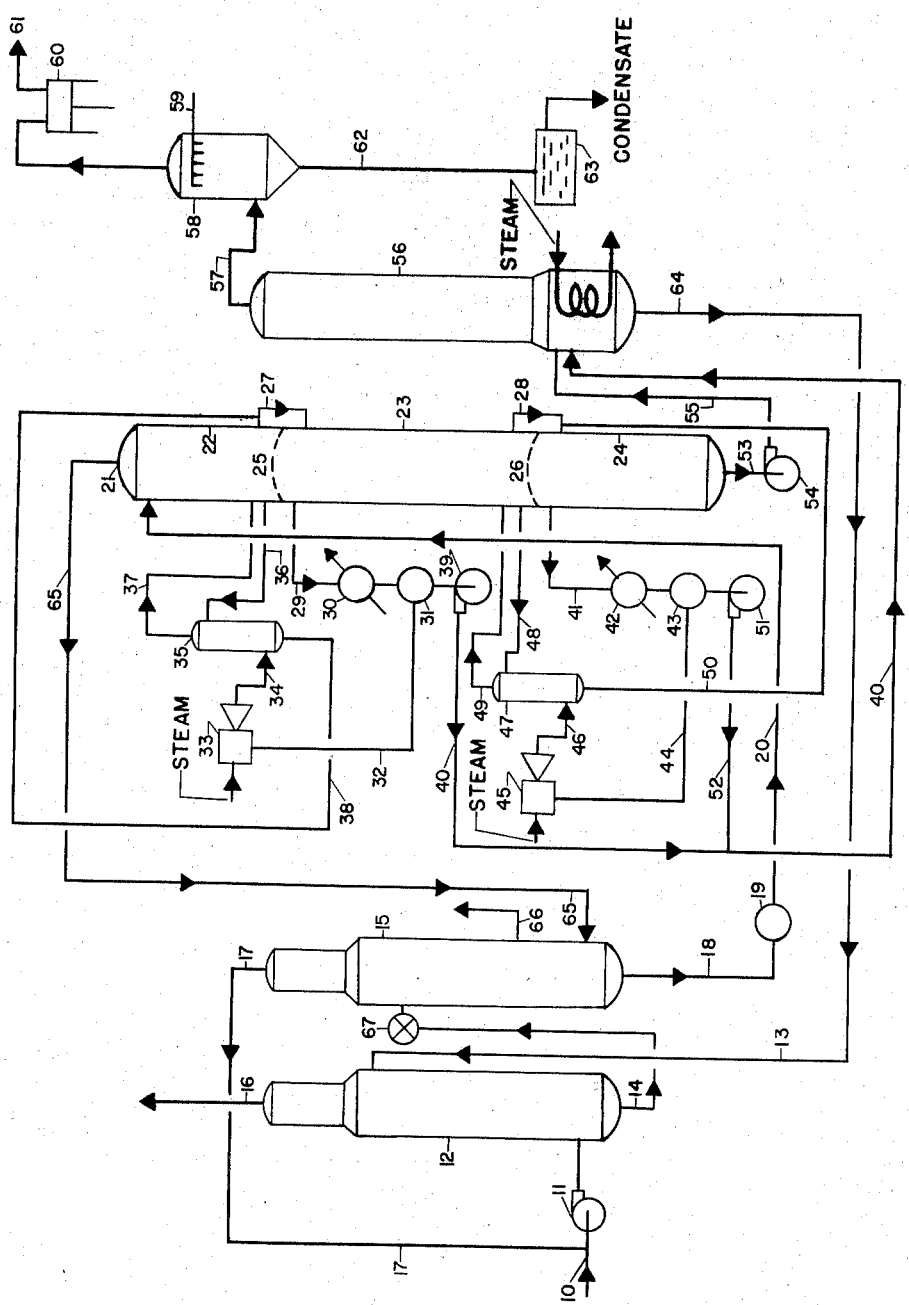

2,868,327
Patented Jan. 13, 1959

2,868,327

ACETYLENE RECOVERY PROCESS

Ross William Rotzler, Texas City, John P. Hickman, La Marque, and William H. Collier, Texas City, Tex., assignors to Monsanto Chemical Company, St. Louis, Mo., a corporation of Delaware Application April 9, 1957, Serial No. 651,696

14 Claims. (Cl. 183—115)

This invention relates to a chemical process whereby acetylene is concentrated by solution in an organic solvent.

An object of this invention is the provision of an efficient process whereby acetylene occurring in dilute gas mixtures is recovered in a more concentrated form.

Methods for the recovery and concentration of acetylene occurring in dilute gas mixtures employing a variety of selective solvents are well known to the art. Among the materials which have been suggested as solvents are esters of carbonic acid, e. g., diethylcarbonate, liquid aliphatic ketones, e. g., cyclohexanone, polyglycols and ethers or esters thereof, lactones, e. g., gammabutyrolactone and its homologues, methylformamide, dimethylacetamide, N-methyl pyrrolidone, etc.

Of particular interest in the present invention are those oxygen-containing organic solvents having a higher boiling point than water and which furthermore are miscible with water. It is not necesary that these solvents be miscible with water in all proportions. On the other hand, if the solvent is miscible to the extent that it disolves up to 10% or 15% by weight of water under the conditions employed in the process, the substance is generally satisfactory for the present purpose.

In the processes of the prior art, the dilute acetylene-containing gases are compressed and then passed into contact with an oxygen-containing organic solvent for acetylene. The solvent containing dissolved acetylene is subjected to desorption which may take place at successively lower pressures and with or without being subjected to increasing temperatures. Since the desorption from the solvent is carried out step-wise in a series of zones wherein the solvent is subjected to said progressively lower pressures (and if desired subjected to correspondingly higher temperatures), the gases evolved are compressed and returned to the next higher pressure zone. A process of this type is disclosed in U. S. Patent 2,250,925.

A preferred and improved process is described in U. S. Patent 2,762,453. In suitable desorption apparatus, a solution of an oxygen-containing liquid solvent containing dissolved acetylene is treated in a series of stages under successively diminished pressures whereby acetylene is liberated from said solution, the so-liberated acetylene is entrained with a high velocity steam jet (thermo-compressor), and the mixture of steam and acetylene is injected into a higher pressure stage. In this process, the high-velocity steam jet serves not only to withdraw acetylene from one stage of the process but also to compress the so-withdrawn acetylene and to inject the same into a higher pressure stage. The steam plays an important role in providing stripping vapor and heat. This method is highly satisfactory in all respects except one. Upon continued operation, it has been found that extensive fouling occurs in the column system on the lower trays of the intermediate and high pressure stages, that is, the trays adjacent to the entrance of the steam from the jet. Theoretically, it is believed that the drizzle of solvent through the perforations in these trays in the staged desorber condenses enough steam to exceed the water concentration at which polymer contained in the solvent will precipitate. A certain amount of polymers of acetylene is contained in the acetylene solvent stream and remains dissolved therein provided certain critical water limits in the solvent are not exceeded. Otherwise, the polymer is precipitated out of solution. This precipitate adheres to the trays and forms agglomerates of polymer which close the perforations, increase the pressure drop, force reduction in throughput, and ultimately necessitate shutdown of the system for cleaning.

We have now found, however, that the difficulties inherent in this system can be overcome by condensing the steam from the steam jets in a separate vessel outside the column system or desorption stages proper. Either a surface condenser such as the conventional shell and tube equipment or a direct contact condenser may be employed. Such an arrangement provides for the condensation of steam without permitting local high concentration of water in circulating solvent thus minimizing polymer precipitation. The use of a separate direct-contact condenser in which solvent from the desorber is circulated also provides for an additional theoretical tray between columns or different pressure stages which will enable the columns or stages to do a more satisfactory job of preventing acetylene loss through the bottom of the last column or lowest pressure stage. Another important advantage of this system of operation is that even if some precipitation does occur, the large flow of solvent in the large free area of the condenser may be expected to wash it away before it can accumulate and restrict flow or otherwise impede the operation of the condenser. Even if substantial deposition of polymer occurs over a protracted period of time and the condenser should become plugged, the location of the condenser outside the column facilitates a quick change-out with only a minimum of down time being experienced in contrast to that occasioned by shutting down and cleaning the columns or column sections themselves.

Accordingly, the invention comprises the process and apparatus for contacting a dilute acetylene-containing gas stream with an oxygen-containing organic solvent for acetylene, liberating the gases dissolved in said solution consisting predominately of acetylene in stages under successively diminished pressures, entraining the liberated gases with a high velocity steam jet, passing said entrained gases and steam into a separate vessel for condensation of the steam, withdrawing the gases overhead from said condenser and introducing them into a higher pressure stage, withdrawing acetylene from the first or highest pressure stage, and withdrawing solvent substantially free of acetylene from the stage of lowest pressure.

A preferred embodiment of a method for carrying out the present invention employing a direct contact condenser is presented below with reference being made to the accompanying schematic drawing illustrating a suitable flow sheet.

In the drawing, numeral 10 indicates a source of dilute acetylene flowing to compressor 11 wherein the pressure of the gas is raised to 5 or more atmospheres. The compressed gas passes to absorber 12, where it is contacted with an acetylene solvent entering the absorber by pipe 13. The solvent, saturated with acetylene (and other soluble gases) leaves by pipe 14 and flows into desorber 15. The gases unabsorbed in the solvent in absorber 12 leave by pipe 16 and may be treated for the recovery of any valuable components contained therein.

In desorber 15 pressure upon the gas is reduced approximately to atmospheric pressure, whereupon a release of the less soluble non-acetylenic constituents takes place. Such release unavoidably carries some acetylene into the desorbed gas. Such desorbed gas, by reason of its content of acetylene, is recycled by pipe 17 to pipe 10 and thereby again subjected to the absorptive treatment in absorber 12.

The solvent containing a substantial portion of the dissolved acetylene leaves desorber 15 by pipe 18 and enters heater 19 where its temperature is raised. The heated solution flows by pipe 20 and enters a staged desorber 21. In this device, which consists of a bubble plate (or other gas-liquid contact means) column divided into a number of stages or zones, desorption is carried out at a progressively decreasing pressure in each stage. In column 21, three separate zones numbered, respectively, 22, 23, and 24, are shown which are formed by separating diaphragms, 25 and 26. Connecting pipe 27 serves to conduct liquid only from stage 22 to stage 23, while pipe 28 serves to conduct liquid only from stage 23 to stage 24.

The gases liberated in stage 23 are withdrawn by pipe 29, enter water-cooled condenser 30, then pass to liquid-gas separator 31. The gases therein separated from the liquid are conveyed by pipe 32 to steam actuated injector or thermo-compressor 33, thence by pipe 34 into condenser 35 containing disc and doughnut type baffles (or other gas-liquid contact means) where they are counter-currently contacted with a stream of solvent coming from zone 22 through pipe 36 and entering at the top of the condenser. The gases from the condenser pass overhead via line 37 and are introduced into stage 22. Liquid from the condenser is returned to the column via line 38 and connecting pipe 27. Condensed liquid collecting in 31 flows to pump 39 and is then fed to the solvent desorber 56 by pipe 40.

Similarly the gases liberated in stage 24 are withdrawn by pipe 41, flow to water-cooled condenser 42, thence to the gas-liquid separator 43. The gases separated from the liquid then flow by pipe 44 to steam actuated injector 45, then by pipe 46 to condenser 47 where they are contacted directly with a stream of solvent coming from zone 23 through pipe 48 and entering at the top of the condenser. The gases are removed overhead from the condenser via pipe 49 and introduced into stage 23. Liquid from the condenser 47 is returned to the column via line 50 and connecting pipe 28. Condensed liquid collecting in 43 flows to pump 51 and is fed through pipe 52 to the solvent desorber 56. It will be obvious that any number of stages may be employed for this process, the three stages shown herein being a practical number. Also, while the preceding description shows only a side stream of solvent withdrawn from stage 22, circulated through the condenser 35 and returned from the condenser through line 38 to stage 23, the invention is not limited to this specific mode of operation. It is to be understood that if desired, all of the solvent transferred from zone 22 to zone 23 may be circulated through the condenser instead of just a portion of the solvent. In this alternative method of operation, pipe 27 connecting zones 22 and 23 would be superfluous. The same considerations apply to the corresponding operation in zones 23 and 24. All or any part of the solvent from zone 23 may be circulated through the condenser 47 and returned to zone 24 from the condenser via pipe 50.

The liquid collecting in the base of stage 24 leaves by pipe 53, enters pump 54 and is then conveyed by pipe 55 into the base of solvent desorber 56. This device is provided with steam heating means and with gas-liquid contact means in the tower portion. In this device, the water present in the solvent is boiled off under diminished pressure. The water vapor together with any impurities remaining in the solvent (e. g., diacetylene, allylene, allene, etc.) are drawn off through pipe 57 and enter a barometric condenser 58. Cold water is supplied to condenser 58 at 59, while the pressure is reduced in the condenser 58 and desorber 56 by vacuum pump 60. The impurities which are not condensed in condenser 58 are thus discharged to the atmosphere from pipe 61. Such impurities being in concentrated form are explosive and inflammable and care should be taken in further handling of the same. The waste gas obtained in many of the processes which may be carried out by this invention, has a substantial fuel value, such value may be recovered by burning the gas under boilers, thus furnishing steam for operation of the plant. If desired, the acetylene polymers may be drawn into a gas-actuated jet as disclosed in U. S. Patent 2,715,947, issued August 23, 1955.

The water condenser in barometric condenser 58 flows downwardly by pipe 62 into sump 63, from which point it may be disposed of in any desired manner.

The solvent which has been dehydrated in 56 leaves by pipe 64 and is returned to pipe 13 for reuse in the system.

The gases liberated in zone 22 of staged desorber 21 are passed into the lower part of desorber 15 by means of pipe 65. The product which is acetylene of high purity is obtained as a side stream from desorber 15 by means of pipe 66.

In an alternative method of operation, condenser 35 may be a surface condenser, for example, of the conventional shell and tube type. If this type condenser is used, the gas from zone 23 after separation from the liquid in the separator 31 and entrainment with steam in the steam jet or thermo-compressor 34, is passed into one side of the condenser, which is cooled by solvent introduced from zone 22 circulating through the other side, and the steam is condensed from the gaseous stream. The gas from the condenser is then withdrawn and introduced into zone 22 while the liquid leaving the bottom of the condenser through line 38 is introduced into zone 23 via connecting pipe 27. As has been noted previously, pipe 27 is not required if all the solvent introduced into zone 23 from zone 22 is circulated through the condenser. Operation here is flexible in that all or only part of the solvent may be circulated through the condenser as desired. Likewise, condenser 47 may be a surface condenser and all or any part of the solvent from zone 23 may be circulated therethrough to effect condensation of the steam in the gases withdrawn from zone 24 and passed through this condenser before being introduced into zone 23. The solvent so circulated is then returned to zone 24 from the bottom of the condenser via pipe 50.

The following example is presented to further illustrate the invention but it is not to be construed as limiting it in any manner or form. Reference numerals used are keyed to the accompanying flowsheet.

*Example*

A gas mixture obtained by the partial combustion of methane with oxygen and containing the following constituents in mole percent

| | Percent |
|---|---|
| $C_2H_2$ | 8.7 |
| $CH_4$ | 4.4 |
| CO | 26.0 |
| $CO_2$ | 4.0 |
| $H_2$ | 54.5 |
| Argon, acetylene polymers, etc. | Balance |
| | 100.0 | is compressed to 100 p. s. i. g. in compressor 11 and then scrubbed in absorber 12 with a solution of dimethylformamide containing approximately 1% of water. A solution containing approximately 1.2% by weight of acetylene together with minor amounts of methane, carbon monoxide, carbon dioxide and hydrogen, as well as diacetylene and other acetylene derivatives is obtained in the absorber and passed through pipe 14, valve 67 and into descriper 15. An overhead gas containing not more than 0.2% of acetylene leaves absorber 12 by pipe 16.

In desorber 15 the pressure of the gas in contact with the solution is reduced to approximately atmospheric, the temperature being about 80° F. to 100° F., with the result that the major proportion of the less soluble non-acetylenic gases are flashed off. These less soluble gases then flow through pipe 17 and are recompressed and returned to the absorber 12.

The dimethylformamide solution leaving the desorber 15 by pipe 18 passes through heater 19, wherein the temperature is raised to approximately 200° F., and is then conducted into zone 22 constituting the upper part of staged desorber 21. The pressure in this zone is about 7 p. s. i. g. The gases flashed from the solvent in this zone contain about 98.8% acetylene and are returned to the base of desorber 15 by means of pipe 65.

The solution treated in zone 22 flows through pipe 27 into zone 23 wherein the pressure has been reduced to about 500 mm. The gases evolved in this zone are withdrawn through pipe 29, passed into condenser 30 and liquid-gas separator 31. From here they are drawn into pipe 32 by the action of steam jet 33, mixed with steam, compressed, and passed through pipe 34 into condenser 35 where by direct contact with solvent from zone 22 introduced at the top of the condenser through pipe 36 the steam accompanying the gases is condensed, liberating heat of condensation and dissolving in the solvent thus expelling additional acetylene from the solution. Acetylene-containing gas from the condenser is withdrawn overhead and introduced by means of pipe 37 into zone 22. Liquid from the condenser is circulated through pipe 38 into connecting pipe 27 from which it enters zone 23. Condensate collected in the liquid-gas separator 31 is fed to the solvent desorber 56 by pump 39 and line 40.

The solution treated in zone 23 flows through pipe 28 into zone 24 wherein the pressure has been reduced to about 160 mm. and wherein the temperature is maintained at about 190° F. The gases liberated in this zone are withdrawn through pipe 41, passed through water-cooled condenser 42, liquid-gas separator 43, and forced into condenser 47 by the action of steam-injector 45 and passed countercurrent therein in direct contact with a stream of solvent from zone 23 introduced through pipe 48. The gases are withdrawn from the condenser 47 and re-introduced into zone 23 by means of pipe 49. Liquid from the condenser 47 passes through line 50 and connecting pipe 28 and is introduced into zone 24. Condensate collected in the liquid-gas separator 43 is fed to the solvent desorber by pump 51 and pipes 52 and 40.

The solution from zone 24 is pumped to solvent desorber 56 by means of pipe 53, pump 54, and pipe 55 where it is subjected to a temperature of about 240° F. at a pressure of 200 mm. Under these conditions approximately one-half of the contained water and most of the diacetylene are volatilized. A side stream consisting of water vapor flows by pipe 68 into stage 24, serving to liberate dissolved gas in the solution contained therein. The solvent containing about 1% of water is returned to the absorber for re-use in the process. The evolved vapors enter barometric condenser 58, are subjected to a cooling water spray and the water vapor is condensed. Any uncondensed diacetylene is drawn into vacuum pump 60 and discharged to the atmosphere for disposal by burning or otherwise.

It will be realized that staged desorber 21 may be replaced by three individual units arranged side-by-side and corresponding to the individual stages shown. A more compact arrangement providing some economy in material and operation is obtained with the design shown above. Also it is to be understood that in place of the dimethylformamide solvent used in the example, there may be used other solvents for acetylene such as N-methylpyrrolidone and butyrolactone, for example.

The dilute acetylene which is to be treated according to the present process may be derived from any source. For example, it may occur as cracked gas obtained from a thermal hydrocarbon cracking process wherein the gases have been subjected to a high temperature as, for example, by treatment in an electric arc. It may also be obtained from the partial combustion of hydrocarbons with oxygen. It may even be obtained as a dilute gas which has been employed or obtained as a waste gas from any chemical operations from which it is desired to recover the same in a concentrated form for further use.

There are certain features and sub-combinations disclosed herein which are of utility without reference to other features and sub-combinations. Such features are contemplated by and are within the scope of the claims. It will be obvious that various changes and modifications may be made in the details without departing from the spirit of the invention.

What is claimed is:

1. A process for treating a solution of an oxygen-containing organic solvent containing dissolved acetylene, said solvent having a boiling point above that of water, which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where substantially all of said steam is condensed, withdrawing the gas from each of said vessels and discharging it respectively into the solution contained in the stage just preceding that from which the gas was originally entrained, withdrawing acetylene from the first stage and withdrawing said solvent substantially free of acetylene from the stage of lowest pressure.

2. A process for treating a solution of an oxygen-containing organic solvent containing dissolved acetylene, said solvent having a boiling point above that of water, which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where at least part of said steam is condensed, withdrawing the gas from each of said vessels and discharging it respectively into the solution contained in the stage just preceding that from which the gas was originally entrained, withdrawing acetylene from the first stage and withdrawing said solvent substantially free of acetylene from the stage of lowest pressure.

3. A process for treating a solution of an oxygen-containing organic solvent containing dissolved acetylene, said solvent having a boiling point above that of water, which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with solvent introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing said solvent substantially free of acetylene from the stage of lowest pressure.

4. A process for treating a solution of an oxygen-containing organic solvent containing dissolved acetylene, said solvent having a boiling point above that of water, which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate surface condensers cooled by circulation therethrough of solvent from the stage just preceding that from which the gas was originally entrained thereby condensing substantially all of said steam, withdrawing the gas from each of said surface condensers and discharging it respectively into the solution contained in the stage just preceding that from which the gas was originally entrained, passing the liquid from said surface condensers respectively into the same stage from which the gas entering said surface condensers was entrained by the steam jet, withdrawing acetylene from the first stage, and withdrawing said solvent substantially free of acetylene from the stage of lowest pressure.

5. A process for treating a solution of dimethylformamide containing dissolved acetylene which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with dimethylformamide solution introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing dimethylformamide substantially free of acetylene from the stage of lowest pressure.

6. A process for treating a solution of butyrolactone containing dissolved acetylene which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with butyrolactone solution introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing butyrolactone substantially free of acetylene from the stage of lowest pressure.

7. A process for treating a solution of N-methyl pyrrolidone containing dissolved acetylene which comprises introducing said solution into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with N-methyl pyrrolidone solution introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing N-methyl pyrrolidone substantially free of acetylene from the stage of lowest pressure.

8. A process for recovering acetylene from gas mixtures containing the same in admixture with nonacetylenic gas which comprises comprising the gas mixture, scrubbing said gas mixture with an oxygen-containing organic solvent having a boiling point above that of water to form a solution thereof, reducing the pressure on said solution whereby said non-acetylenic gas is flashed off from said solution, introducing the resultant solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where substantially all of said steam is condensed, withdrawing said gas from each of said vessels and discharging it respectively into the solution contained in the stage just preceding that from which the gas was originally entrained, withdrawing acetylene from the first stage and withdrawing said solvent substantially free of acetylene from the stage of lowest pressure.

9. A process for recovering acetylene from gas mixtures containing the same in admixture with non-acetylenic gas which comprises compressing the gas mixture, scrubbing said gas mixture with an oxygen-containing organic solvent having a boiling point above that of water to form a solution thereof, reducing the pressure on said solution whereby said non-acetylenic gas is flashed off from said solution, introducing the resultant solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where at least part of said steam is condensed, withdrawing the gas from each of said vessels and discharging it respectively into the solution contained in the stage just preceding that from which the gas was originally entrained, withdrawing acetylene from the first stage, and withdrawing said solvent substantially free of acetylene from the stage of lowest pressure.

10. A process for recovering acetylene from gas mixtures containing the same in admixture with non-acetylenic gas which comprises compressing the gas mixture, scrubbing said gas mixture with an oxygen-containing organic solvent having a boiling point above that of water to form a solution thereof, reducing the pressure on said solution whereby said non-acetylenic gas is flashed off from said solution, introducing the resultant solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with solvent introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessel was entrained by the steam jet, withdrawing acetylene from the first stage, and withdrawing said solvent substantially free of acetylene from the stage of lowest pressure.

11. A process for recovering acetylene from gas mixtures containing the same in admixture with non-acetylenic gas which comprises compressing the gas mixture, scrubbing said gas mixture with an oxygen-containing organic solvent having a boiling point above that of water to form a solution thereof, reducing the pressure on said solution whereby said non-acetylenic gas is flashed off from said solution, introducing the resulting solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in stage, entraining the gas evolved in each of the stages except the first stage with a high velocity steam jet, discharging the said gas and steam from each stage respectively into separate surface condensers cooled by circulation therethrough of solvent from the stage just preceding that from which the gas was originally entrained thereby condensing substantially all of said steam, withdrawing the gas from each of said surface condensers and discharging it respectively into the solution contained in the stage just preceding that from which the gas was originally entrained, passing the liquid from said surface condensers respectively into the same stage from which the gas entering said surface condensers was entrained by the steam jet, withdrawing acetylene from the first stage, and withdrawing said solvent substantially free of acetylene from the stage of lowest pressure.

12. A process for recovering acetylene from gas mixtures containing the same in admixture with non-acetylenic gas which comprises compressing the gas mixture, scrubbing said gas mixture with dimethylformamide to form a solution thereof, reducing the pressure on said solution whereby said non-acetylenic gas is flashed off from said solution, introducing the resulting solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with dimethylformamide solution introduced from the stage just preceding that from which the gas was originally entrained by the steam jet thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing dimethylformamide substantially free of acetylene from the stage of lowest pressure.

13. A process for recovering acetylene from gas mixtures containing the same in admixture with non-acetylenic gas which comprises compressing the gas mixture, scrubbing said gas mixture with butyrolactone to form a solution thereof, reducing the pressure on said solution whereby said non-acetylenic gas is flashed off from said solution, introducing the resulting solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with butyrolactone solution introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing butyrolactone substantially free of acetylene from the stage of lowest pressure.

14. A process for recovering acetylene from gas mixtures containing the same in admixture with non-acetylenic gas which comprises compressing the gas mixture, scrubbing said gas mixture with N-methyl pyrrolidone to form a solution thereof, reducing the pressure on said solution whereby said non-acetylenic gas is flashed off from said solution, introducing the resulting solution containing dissolved acetylene into the first of a series of desorbing stages, said stages being maintained under progressively reduced pressures, each stage being maintained at a pressure lower than the pressure in the preceding stage, transferring said solution from the first stage successively to each of the succeeding stages of lower pressure whereby acetylene gas is evolved from said solution in each stage, entraining the gas evolved in each of the stages except the first stage with a high velocity steam jet, discharging the said gas and steam from each stage respectively into separate vessels where they are brought into direct contact with N-methyl pyrrolidone solution introduced from the stage just preceding that from which the gas was originally entrained thereby condensing substantially all of said steam, withdrawing the gas from each of said vessels and discharging it respectively into the solution contained in the stage just preceding that from which the gas was originally entrained, passing the liquid from said vessels respectively into the same stage from which the gas entering said vessels was entrained by the steam jet, withdrawing acetylene from the first stage, and withdrawing N-methyl pyrrolidone substantially free of acetylene from the stage of lowest pressure.

References Cited in the file of this patent

UNITED STATES PATENTS 2,762,453　　Alexander _____ Sept. 11, 1956

UNITED STATES PATENT OFFICE

CERTIFICATE OF CORRECTION

Patent No. 2,868,327 January 13, 1959

Ross William Rotzler et al.

It is hereby certified that error appears in the printed specification of the above numbered patent requiring correction and that the said Letters Patent should read as corrected below.

Column 4, line 74, for "describer" read -- desorber --; column 8, line 43, for "comprising" read -- compressing --.

Signed and sealed this 16th day of June 1959.

(SEAL)
Attest:

KARL H. AXLINE
Attesting Officer

ROBERT C. WATSON
Commissioner of Patents